United States Patent [19]

Esashi et al.

[11] 3,797,779

[45] Mar. 19, 1974

[54] TAPE CASSETTE

[75] Inventors: Hanjiro Esashi; Katsuyoshi Kawamata, both of Miyagi, Japan

[73] Assignee: Sony Corporation, Tokyo, Japan

[22] Filed: July 10, 1972

[21] Appl. No.: 270,279

[30] Foreign Application Priority Data

July 14, 1971 Japan .......................... 46-62244[U]

[52] U.S. Cl. ................................ 242/199, 274/4 C
[51] Int. Cl.... G03b 1/04, G11b 15/32, G11b 23/04
[58] Field of Search............ 242/197, 200; 274/4 C, 274/11 C; 352/72, 78

[56] References Cited

UNITED STATES PATENTS

| | | | |
|---|---|---|---|
| 3,096,038 | 7/1963 | Fundingsland | 242/200 |
| 3,282,523 | 11/1966 | Murdoch | 242/200 X |

*Primary Examiner*—Leonard D. Christian
*Attorney, Agent, or Firm*—Lewis H. Eslinger, Esq.; Alvin Sinderbrand, Esq.

[57] ABSTRACT

In a tape cassette for use in a magnetic recording and/or reproducing apparatus, and in which the tape is wound on, and extends between freely rotatable reels in the cassette housing having an opening across which a run of the tape is guided for access to the tape through such opening; slackening of the tape run as a result of free turning of the reels is avoided by providing resiliently flexible elements, preferably of plastic, each of which is fixed at one end within the housing and has its other free end engaged with a portion of the tape between a respective one of the reels and the tape run for urging the respective tape portion into a relatively tortuous path in which the tape is engaged by a fixed surface, which may be on a guide member or otherwise, and which imposes an increased resistance to movement of the tape into said tape run, and each resiliently flexible element is deflected in response to tension in the engaged tape portion to permit the latter to follow a relatively less tortuous path in which the resistance to movement of the tape is reduced to substantially free the tape for transfer between the reels.

9 Claims, 6 Drawing Figures

TAPE CASSETTE

This invention relates generally to tape cassettes for use in magnetic recording and/or reproducing apparatus, and more particularly is directed to improvements in tape cassettes of the type in which the tape is wound on, and is guided between freely rotatable reels in the cassette housing so that a run of the tape traverses a cutout or opening provided in the housing for access to the tape.

When a tape cassette of the described type is installed in a magnetic recording and/or reproducing apparatus, a part of the latter extends into the opening of the cassette housing for engagement with the magnetic tape exposed at such opening. For example, in the case of an audio tape recording and/or reproducing apparatus, the magnetic tape may be maintained within the cassette housing during recording and reproducing operations and the part of the apparatus which extends through the opening of the cassette housing and engages the tape may be a magnetic recording and reproducing head. In the case of apparatus for magnetically recording and/or reproducing video signals on a magnetic tape supplied within a cassette, the recording and reproducing of signals on the tape is frequently effected by a rotary magnetic head which scans skewed record tracks on the tape as the latter is guided about the periphery of a cylindrical guide drum which substantially coincides with the circular path of the rotary head and which is located apart from the cassette housing. Thus, in the latter case, it is necessary to withdraw the magnetic tape from within the cassette housing and to wrap or load the withdrawn tape about at least a portion of the periphery of the guide drum. Although such loading of the tape on the guide drum was originally manually effected, automatic devices have been provided, for example, as disclosed in U.S. Pat. application Ser. No. 113,988, filed Feb. 9, 1971 and now abandoned, and having a common assignee herewith. With the identified automatic loading device, upon the installation of the tape cassette in the recording and/or reproducing apparatus, a tape engaging member of the automatic loading device extends into the opening of the cassette housing for engagement with the tape, whereupon the tape engaging member is actuated or moved in a path that extends out of the cassette housing for withdrawing the tape from the latter and wrapping or loading the tape on the guide drum. In either case, that is, whether the tape remains within the cassette housing during recording and reproducing operations and is engaged by a magnetic head which extends into the cassette housing through the opening in the latter, or the magnetic tape is grasped by a tape engaging member which initially extends into the cassette housing through the opening in the latter and then is withdrawn from the cassette housing for similarly withdrawing the tape and wrapping the latter about the guide drum during recording or reproducing of signals thereon by means of a rotary head, it is essential for the proper operation of the recording and/or reproducing apparatus or of its automatic loading device, as the case may be, that excessive looseness or slackness in the run of the tape that extends across the opening of the cassette housing be avoided when the cassette is installed in the recording and/or reproducing apparatus. If such run of the tape is excessively loose or slack and thus does not follow a substantially straight path between guides provided within the cassette housing at opposite sides of the opening of the latter, then the tape may not be properly engaged by the magnetic head or by the tape engaging member of the tape loading device which may lead to either damage to the tape or defective recording or reproducing operations.

The possiblity of excessive looseness or slackness of the tape, particularly at the run thereof which extends across the opening of the cassette housing, arises by reason of the fact that the reels on which the tape is wound are loosely or freely rotatable within the cassette housing. Thus, when the cassette is being transported or is otherwise apart from the recording and/or reproducing apparatus with which it is intended to be used, one or both of the reels within the cassette housing may turn in the direction for unwinding the tape therefrom to develop slack in the tape extending between the reels, and particularly in the run of the tape extending across the opening of the cassette housing.

It has been proposed in U.S. Pat. No. 2,894,700, to provide a tape cassette or magazine with brakes for holding taut or preventing undue slackness in the run of the tape which extends across an access window or windows provided in the cassette housing between spaced apart guide members therein. Such previously proposed brakes were constituted by leaf-spring arms each secured, at one end, within the cassette housing and carrying a felt pad at its other end urged against a respective one of the guide members or pins with the tape therebetween for frictionally resisting movement of the tape relative to the respective guide member. With the described brakes, the recording and/or reproducing apparatus with which the cassette is intended to be used has to be provided with fixed brake releasing pins which, upon installation of the cassette or magazine, extend through slots in the cassette housing and engage the leaf-spring arms for deflecting the latter and thereby moving the respective felt pads away from the adjacent guide pins so that the tape may be freely driven during recording and reproducing operations, for example, by means of a rotated capstan and pinch roller engaged with the tape and/or by means of the rotary drive of one or the other of the tape reels. However, the need for providing the recording and/or reproducing apparatus with brake releasing members by which the brakes in the cassette are released upon the installation of the tape cassette or magazine undesirably complicates such apparatus.

It has further been proposed, for example, in U.S. Pat. application Ser. No. 232,005, filed Mar. 6, 1972, and having a common assignee herewith, to provide a tape cassette for use in a video tape recorder with a resiliently flexible support member which is secured, at one end, within the cassette housing and which extends along the inner side of the run of the tape traversing the opening of the cassette housing through which a tape engaging member is extendable for grasping the tape and then withdrawing the latter from the cassette housing for engagement or loading on the guide drum. However, such resiliently flexible support member does not prevent undue slackness in the associated run of the tape, and merely avoids inward buckling of the tape run. Thus, the tape may still protrude outwardly through the opening of the cassette housing in the event that the tape between the reels becomes slack due to the free rotation of the reels when the cassette is apart from the video tape recorder. When the slack tape protrudes through the opening or cutout of the cassette housing, there is the possibility that such protruding tape will be damaged during installation of the cassette in the video tape recorder, and also that the tape may not be properly engaged by the tape engaging member provided for automatic loading of the tape about the guide drum.

Accordingly, it is an object of this invention to provide a tape cassette, as aforesaid, with elements for avoiding undue slackness in the run of the tape extending across an opening of the cassette housing when the cassette is removed from the magnetic recording and/or reproducing apparatus with which it is intended to be used, and in which the tape is automatically released so as to be freely transferred between the reels, as during recording and reproducing operations of such apparatus.

Another object is to provide a tape cassette, as aforesaid, in which the tape is released for substantially free transfer between the reels in response to the existence of tension in the tape between the reels, for example, upon the driving of the tape during recording or reproducing operations.

In accordance with an aspect of this invention, slackening of the tape run which transverses the opening of the cassette housing, for example, as a result of free turning of the tape reels within the cassette housing when the cassette is apart from the magnetic recording and/or reproducing apparatus, is avoided by providing resiliently flexible elements, preferably of plastic, each fixed at one end within the cassette housing and having its other free end engaged with a portion of the tape between a respective one of the tape reels and the tape run for urging the respective tape portion into a relatively tortuous path in which the tape is engaged by a fixed surface, which may be on a guide member, and which imposes an increased resistance to movement of the tape into the tape run, and each resiliently flexible element is deflected in response to tension in the respective engaged tape portion to permit the latter to follow a relatively less tortuous path in which the resistance to movement of the tape is reduced to substantially free the tape for transfer between the reels.

The above, and other objects, features and advantages of the invention, will be apparent in the following detailed description of illustrative embodiments thereof which is to be read in connection with the accompanying drawings, wherein.

Figure 1:
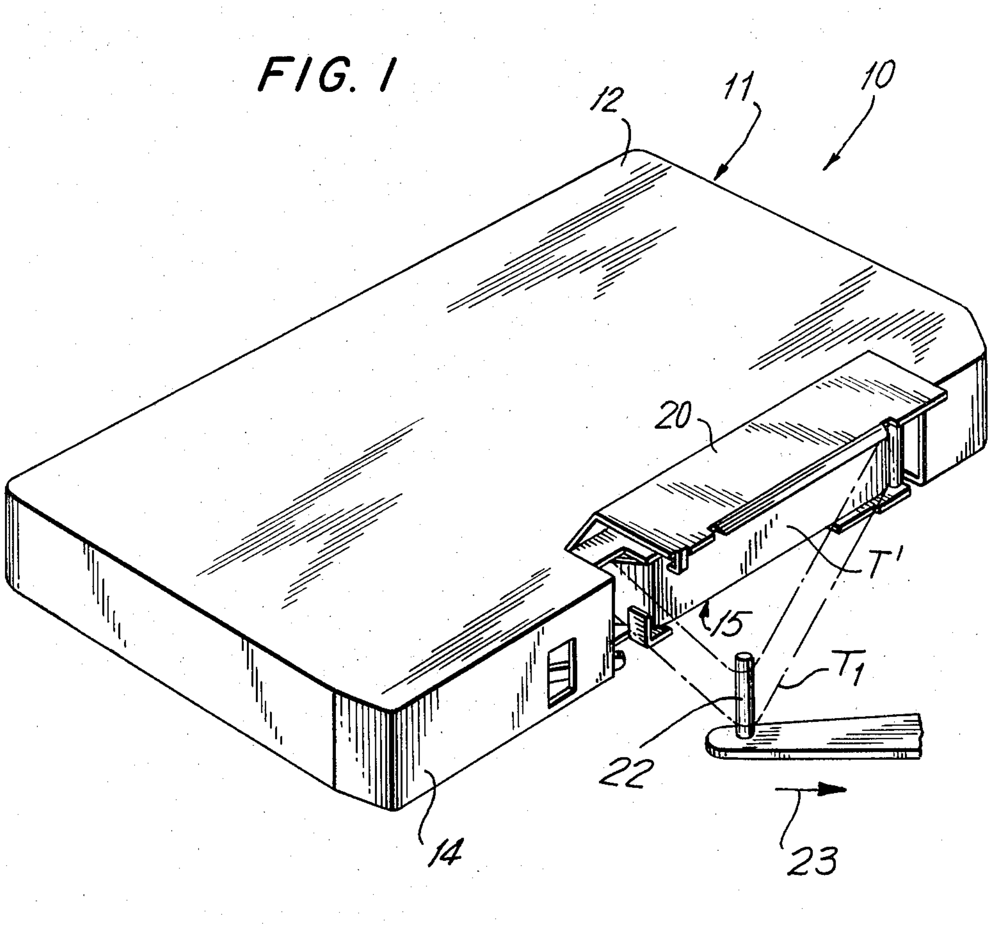
FIG. 1 is a perspective view of a tape cassette in accordance with one embodiment of this invention, and which is shown in association with a tape engaging member of a magnetic recording and/or reproducing apparatus by which tape may be withdrawn from the cassette.

Referring to the drawings in detail and initially to FIG. 1 thereof, it will be seen that the illustrated tape cassette 10 in accordance with this invention comprises a housing 11 of flat, substantially rectangular configuration which may be formed of a suitable plastic and consists of a top wall 12, a bottom wall 13 (FIG. 2) and a peripheral wall 14 joining the margins of top and bottom walls 12 and 13. The peripheral wall 14 and ajdacent portions of top and bottom walls 12 and 13 are cut away along one relatively long side of rectangular housing 11 to define an elongated opening or cutout 15. Reels 16 and 17 (FIG. 2) are suitably located within cassette housing 11 so as to be freely rotatable in side-by-side relation, and a magnetic tape T is wound on reels 16 and 17 and is guided therebetween by guide pins 18 and 19 located adjacent the opposite ends of opening 15. Thus, a run T' of the magnetic tape extending between guide pins 18 and 19 runs along or traverses the opening 15 and may be engaged and withdrawn from cassette housing 11 through such opening, as hereinafter described. A lid 20 (FIG. 1) may be provided for normally closing opening 15 and thereby protecting the tape T contained within cassette housing 11 from exposure to dust and from contact with the operator's fingers during handling of cassette 10. The lid 20 may be pivotally attached to housing 11 for swinging between the opened position shown on FIG. 1 and a closed position, as indicated in broken lines at 20' on FIG. 2, and in which the lid extends across and substantially closes opening 15. A latching mechanism (not shown) may be provided for holding lid 20 in its condition, with such latching mechanism being released and the lid moved to its opened position upon the installation of cassette 10 in a magnetic recording and/or reproducing apparatus (not shown) with which the cassette is to be used. As shown particularly on FIG. 2, cassette housing 11 may further have a partition 21 extending between top and bottom walls 12 and 13 intermediate guide pins 18 and 19 along the edge of cutout or opening 15 in bottom wall 13 and being disposed inwardly or forwardly in respect to run T' of the magnetic tape extending between guide pins 18 and 19.

When cassette 10 is installed in a magnetic recording and/or reproducing apparatus of the kind having an automatic tape loading device, for example, of the type disclosed specifically in U.S. Pat. application Ser. No. 113,988, identified more fully above, a tape engaging member 22 (FIG. 1) of the automatic loading device is made to extend upwardly within opening or cutout 15 of cassette housing 11 so as to be disposed between partition 21 and the tape run T' extending across opening 15 between guide pins 18 and 19. When tape engaging member 22 is thereafter displaced rearwardly, that is, in the direction of the arrow 23 on FIG. 1, the tape engaging member 22 withdraws the tape between reels 16 and 17 from the cassette housing through opening 15, for example, as indicated in broken lines at $T_1$ on FIG. 1. Thereafter, the tape loading device, which forms no part of this invention and is not further illustrated or described, may wrap the withdrawn tape about at least a portion of the periphery of a cylindrical guide drum (not shown) for scanning of the thus guided tape by a rotary head or heads associated with the guide drum. However, it will be apparent that, if there is undue looseness or slackness in tape run T' traversing opening 15 at the time when cassette 10 is installed in the magnetic recording and/or reproducing apparatus, such tape run T′ may either protrude from opening 15 and become snagged or caught on a part of the apparatus, with consequent damage to the tape, or the loose run T′ may be inwardly bowed or buckled from the position shown on FIG. 2, for example, so as to extend between tape engaging member 22 and partition 21 with the result that, when tape engaging member 22 is displaced in the direction of the arrow 23 on FIG. 1, the tape between guide pins 18 and 19 is not engaged by member 22 and therefore is not withdrawn from cassette housing 11 for loading on the tape guide drum. Accordingly, it is important that the tape run T′ be maintained in a substantially taut condition, or at least that substantial looseness or slackness in such tape run be avoided, particularly at the time when cassette 10 is being installed in the recording and/or reproducing apparatus with which it is intended to be used.

In accordance with the present invention, the development of looseness or slackness in tape run T′ by reason of turning of reels 16 and 17 which are freely rotatable within cassette housing 11 at a time when cassette 10 is apart from the magnetic recording and/or reproducing apparatus is avoided by providing the cassette 10 with resiliently flexible elements 24 and 25 which are respectively associated with the tape portion $T_2$ between reel 16 and tape run T′ and with the tape portion $T_3$ between reel 17 and tape run T′. The elements 24 and 25 may be formed of strips of suitably resilient plastic, such as, polyester resin, or of a spring metal which is relatively highly flexible. It will be seen that the resiliently flexible element 24 is fixedly mounted at one end in housing 11, for example, on a support wall 26 (FIG. 2) which is near the end of opening 15 adjacent guide pin 18 so that the other or free end portion of element 24 extends across a line that is tangential to reel 16 from guide pin 18. Thus, when element 24 is in its normal position indicated in full lines on FIG. 2, the free end portion of the element 24 diverts the respective tape portion into the relatively tortuous path indicated at $T_2$ and in which the tape is wrapped about a relatively substantial portion of the peripheral surface of adjacent guide pin 18 for imposing an increased resistance to the movement of the tape into run T′ from the reel 16. On the other hand, when tension arises in the tape portion between reel 16 and guide pin 18, such tension causes the tape to seek the shortest possible route between pin 18 and reel 16 and thereby deflects the free end portion of resilient element 24, for example, to the position indicated at 24′ on FIG. 2. As a result of such deflection of element 24, the tape portion between pin 18 and reel 16 follows a relatively less tortuous path, as indicated at $T'_2$ in which the wrap of the tape about the surface of guide pin 18 is relatively reduced to similarly reduce the resistance to movement of the tape. It is further to be noted that, in the illustrated arrangement according to this invention, the resiliently flexible element 24 is normally urged to a position in which its free end portion bears yieldably against guide pin 18 for gripping or pinching the tape therebetween. Thus, the resistance to the movement of tape from reel 16 into run T′ and to the resultant slackening of the tape in such run is derived from the increased surface area of guide pin 18 engaged by the tape when element 24 is in its normal position and also from the pinching of the tape between element 24 and the surface of guide pin 18.

Figures 2, 3:
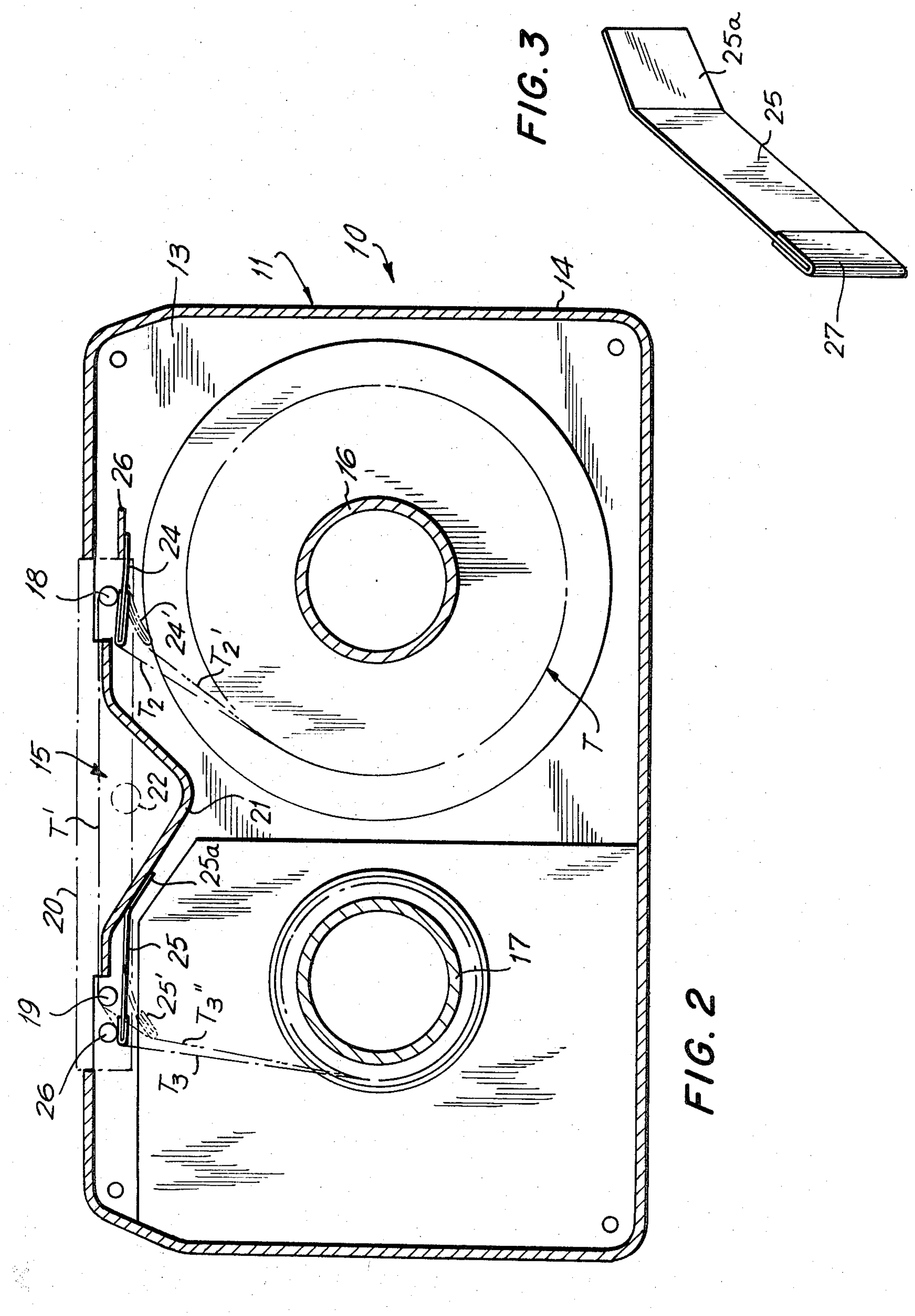
FIG. 2 is a top plan view of the cassette of FIG. 1 with its housing shown broken away and partly in section.
FIG. 3 is a detail perspective view of an element included in the cassette of FIGS. 1 and 2 in accordance with this invention.

The resiliently flexible element 25 may be associated with guide pin 19 in a manner similar to that described above with respect to element 24 and guide pin 18 or, as shown, a further member 26 similar to the guide pin 19 may be mounted adjacent the latter for cooperation with element 25 in providing the increased resistance to movement of the tape from reel 17 to tape run T′ when resiliently flexible element 25 is in its normal position shown in full lines on FIG. 2. It will be seen that element 25 has one end portion **25*a* cemented or otherwise suitably secured to partition 21 so that the free end portion of element 25 extends across a line that is tangential to reel 17 from the adjacent guide pin 19. Thus, as before, the free end portion of element 25 will normally divert the tape into the relatively tortuous path indicated at $T_3$ in which the tape between reel 17 and run T′ is frictionally engaged with the surface of member 26 and, in fact, pinched between that surface and the end portion of member 25 for providing the desired increased resistance to movement of the tape into run T′ from reel 17. However, when tension arises in the portion of the tape between reel 17 and tape run T′, the free end portion of element 25 is deflected, for example, to the position indicated in broken lines at 25′ on FIG. 2, whereby the tape assumes a less tortuous path $T'_3$ in which the tape no longer engages the surface of member 26** so that the resistance to movement of the tape is decreased.

Preferably, in accordance with this invention, at least the free end portion of each of the resiliently flexible elements 24 and 25 has a surface with a relatively low coefficient of friction in respect to the magnetic tape. For example, as indicated at 27 in respect to the element 25 on FIG. 3, the free end portion of each of the elements 24 and 25 preferably has a coating or layer of polytetrafluoroethylene thereon which affords a low coefficient of friction in respect to the magnetic tape. It will be apparent that, when one or the other of the reels 16 and 17 is driven in the usual manner during a recording, reproducing or other operation of the apparatus with which the cassette 10 is intended to be used, tension arises in the tape between reels 16 and 17 so that the resiliently flexible elements are deflected to the positions indicated at 24′ and 25′ on FIG. 2, whereby the tape is substantially free for movement between reels 16 and 17. It will be seen that, when elements 24 and 25 are deflected in response to operation of an associated apparatus the tape continues to engage the free end portions of the deflected elements 24 and 25 and the low friction coating 27 on such free end portions ensures that the tape will be protected from excessive wear or other damage by reason of the continuing contact with elements 24 and 25. The layer or coating 27 of polytetrafluoroethylene on each of the elements 24 and 25 further serves to reduce the static electricity that is induced on the magnetic tape as a result of the movement of the latter in contact with the elements 24 and 25.

Of course, when cassette 10 is removed from a magnetic recording and/or reproducing apparatus, the absence of tension in the tape extending between reels 16 and 17 permits elements 24 and 25 to return to the positions shown in full lines on FIG. 2 at which relatively increased resistances are imposed in respect to the movement of the tape from reel 16 and from reel 17 into tape run T′ extending across opening 15. Thus, tape run T′ remains relatively taut, or at least undue slackness therein is avoided, even though reels 16 and 17 may be free to turn within cassette housing 11 and thereby create looseness in the tape between reel 16 and element 24 and between reel 17 and element 25.

Figures 4, 5:
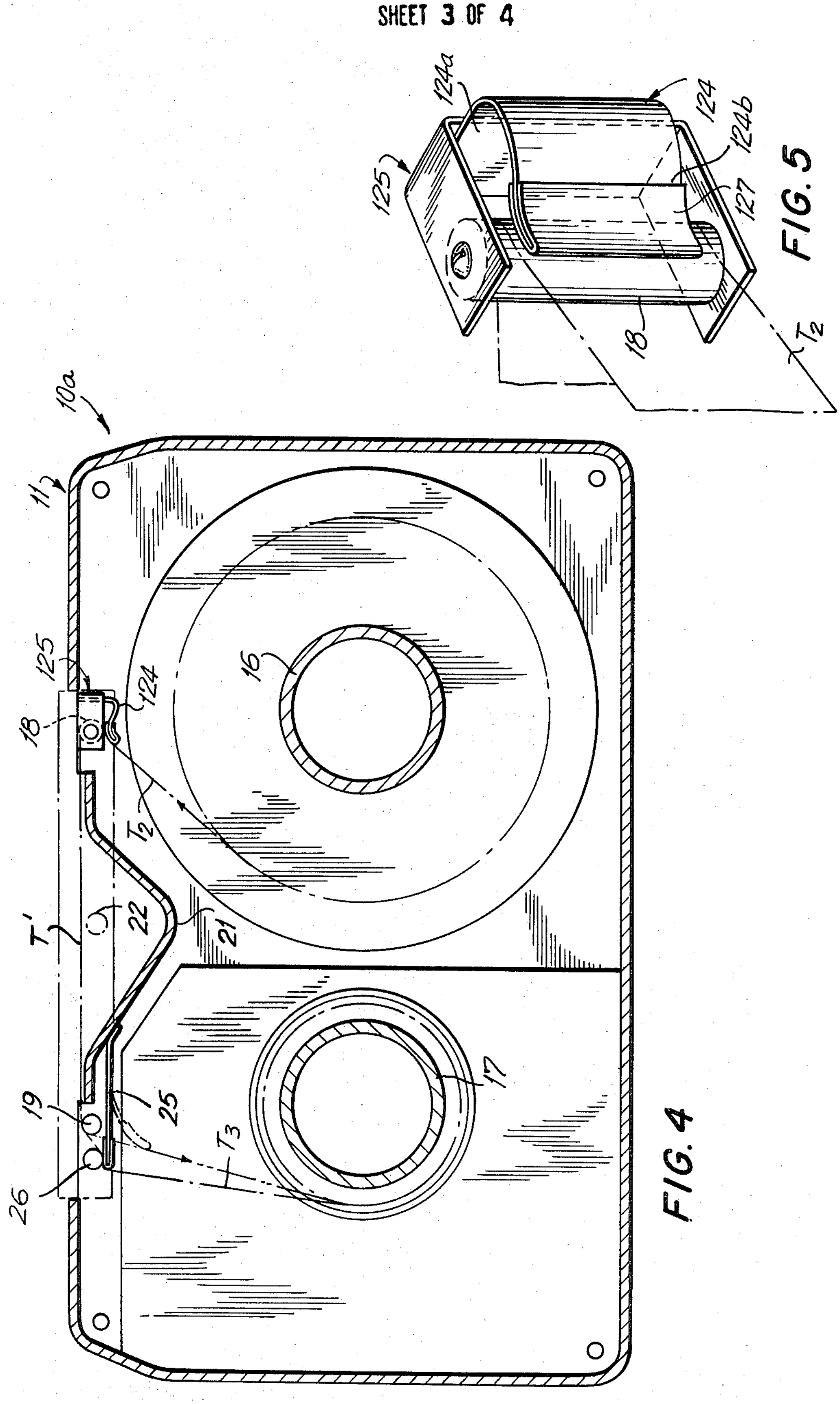
FIG. 4 is a view similar to that of FIG. 2, but showing another embodiment of the present invention.
FIG. 5 is an enlarged, detail perspective view illustrating a sub-assembly included in the cassette of FIG. 4; and adjacent

Referring now to FIG. 4, it will be seen that the tape cassette 10*a* there illustrated is generally similar to the previously described cassette 10 in accordance with this invention and differs therefrom only in respect to the resiliently flexible element 124 which replaces the element 24 of the first described embodiment. As shown particularly on FIG. 5, the resiliently flexible element 124 is permanently shaped or contoured to provide substantially right-angularly related portions 124*a* and 124*b*. The portion 124*a* is cemented or otherwise suitably secured to the bight of a C-shaped bracket 125 which further supports the guide pin 18 between the ends of its arms. The portion 124*b* of element 124 terminates in a curving section that is preferably provided with a coating 127 of polytetrafluoroethylene, and that is resiliently urged against the surface of guide pin 18. It will be apparent that, in the normal position of element 124, the latter extends across a straight line tangent to guide pin 18 and reel 16 so that the tape is wrapped about a relatively large portion of the surface of guide pin 18 and further pinched between that surface and the free end portion of element 124, with the result that there is a relatively high resistance to movement of the tape from reel 16 into tape run $T_1$. However, when tension arises in the tape between reels 16 and 17, the tension acting in the tape portion $T_2$ urges the end portion of element 124 to deflect away from the surface of guide pin 18 with the result that the surface area of the guide pin engaged by the tape is reduced, and further the pressure with which the tape is urged against the surface of guide pin 18 is reduced, whereby to substantially decrease the resistance to movement of the tape.

Figure 6:
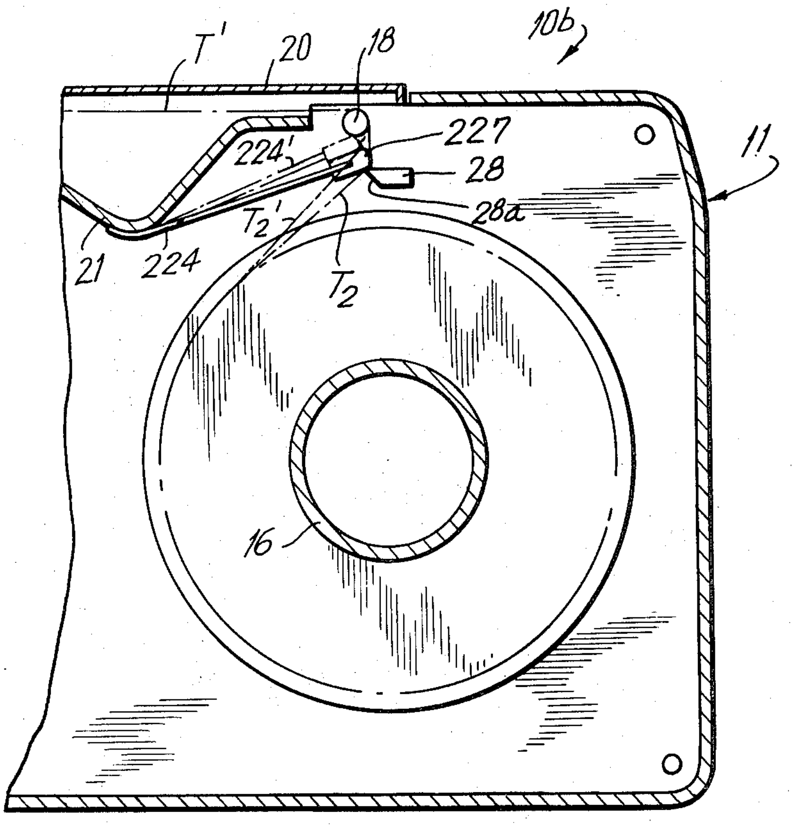
FIG. 6 is a fragmentary plan view similar to a portion of FIG. 2, and showing still another embodiment of this invention.

In each of the previously described embodiments, the resiliently flexible element 24 or 124 associated with the tape portion between guide pin 18 and tape reel 16 is engageable with the adjacent guide pin 18 in order to provide the increased resistance to movement of the tape by which slackness or looseness in tape run T' is avoided. However, it will be seen from FIG. 6 that, in accordance with another embodiment of this invention, a resiliently flexible element 224 may be secured, at one end, to partition 21 so as to have its free end portion, which may be covered with a coating or film 227 of polytetrafluoroethylene, projecting across the straight line extending tangential to reel 16 from guide pin 18. The element 224 is normally urged to the position shown in full lines on FIG. 6 where its free end portion is spaced from guide pin 18 and the tape follows a relatively tortuous path $T_2$, and tension in the tape is effective to deflect element 224 in the direction toward guide member or pin 18, for example, to the position indicated in broken lines at 224' on FIG. 6, at which the tape is allowed to follow a less tortuous path $T'_2$ between guide pin 18 and reel 16. When element 224 is in its normal position indicated in full lines on FIG. 6, the free end portion of such element presses the tape against a fixed braking element 28, and thereby achieves the desired increased resistance to movement of the tape from reel 16 into tape run T'. It will be seen that the member 28 preferably has a beveled edge surface 28*a* at the side thereof extending toward the free end portion of element 224 so that, in the event that such free end portion of element 224 inadvertently is displaced to the side of member 28 directed toward reel 16, the existence of tension in the tape between reels 16 and 17 will cause the free end portion of element 224 to slide against beveled surface 28*a* and thereby again attain the desired position between member 28 and guide pin 18.

The above described cassettes 10, 10*a* and 10*b* embodying this invention have been shown to be of the type intended for use in video tape recorders in which the tape is withdrawn from the cassette housing, as by the tape engaging member 22 (FIG. 1), and guided about an external tape guide drum having a rotary head or heads associated therewith for recording or reproducing the signals on the tape. However, the invention can be similarly applied to tape cassettes for use in audio or other recording and/or reproducing apparatus in which the tape remains in the cassette during recording and reproducing operations and is engaged by a magnetic head or heads extended into the cassette.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. In a cassette for use in a magnetic recording and/or reproducing apparatus and which comprises a housing containing freely rotatable reels having magnetic tape wound thereon with the tape extending between the reels being guided to direct a run thereof across an access opening in the housing; tape braking means for avoiding slackening of said run as a result of free turning of at least one of said reels, said braking means including at least one resiliently flexible element which is fixedly mounted at one end in said housing and has its other free end engaged with said tape at a portion of the tape between said run and said one reel for urging said tape portion into a relatively tortuous path, at least the surface of said free end of said resiliently flexible element engaged with said tape having a coating which has a relatively low coefficient of friction with respect to said tape, and means engageable by said tape portion in said relatively tortuous path for imposing an increased resistance to the movement of tape there along at least in the direction toward said run, said resiliently flexible element deflecting in response to tension in said tape portion to permit the latter to follow a realtively less tortuous path in qhich said resistance to movement of the tape is reduced to substantially free the tape for movement between said run and said one reel.

2. A cassette according to claim 1, in which said braking means further includes another resiliently flexible element fixedly mounted at one end in said housing and having its other free end engaged with said tape at the portion of the latter between said run and the other of said reels for urging the last mentioned portion of the tape into a relatively tortuous path, and means engageable by said last mentioned tape portion in said relatively tortuous path thereof for imposing an increased resistance to the movement of tape therealong at least in the direction toward said run, said other resiliently flexible element deflecting in response to tension in said last mentioned tape portion to permit the latter to follow a relatively less tortuous path in which the respective resistance to movement of the tape is reduced to substantially free the tape for movement between said run and said other reel.

3. In a cassette for use in a magnetic recording and/or reproducing apparatus and which comprises a housing containing freely rotatable reels having magnetic tape wound thereon with the tape extending between the reels being guided to direct a run thereof across an access opening in the housing; tape braking means for avoiding slackening of said run as a result of free turning of at least one of said reels, said braking means including at least one resiliently flexible element which is fixedly mounted at one end in said housing and has its other free end engaged with said tape at a portion of the tape between said run and said one reel for urging said tape portion into a relatively tortuous path, said resiliently flexible element having a coating of polytetrafluoroethylene on said free end to provide a relatively low coefficient of friction in respect to the tape, and means engageable by said tape portion in said relatively tortuous path for imposing an increased resistance to the movement of tape there along at least in the direction toward said run, said resiliently flexible element deflecting in response to tension in said tape portion to permit the latter to follow a relatively less tortuous path in which said resistance to movement of the tape is reduced to substantially free the tape for movement between said run and said one reel.

4. A cassette according to claim 1, in which there are guide members in said housing at opposite sides of said opening for directing said run of the tape across said opening.

5. A cassette according to claim 4, in which said means for imposing an increased resistance to the movement of the tape is constituted by the surface of at least one of said guide members.

6. In a cassette for use in a magnetic recording and/or reproducing apparatus and which comprises a housing containing freely rotatable reels having magnetic tape wound thereon with the tape extending between the reels being guided to direct a run thereof across an access opening in the housing; tape braking means for avoiding slackening of said run as a result of free turning of at least one of said reels, said braking means including at least one resiliently flexible element which is fixedly mounted at one end in said housing and has its other free end engaged with said tape at a portion of the tape between said run and said one reel for urging said tape portion into a relatively tortuous path, guide members in said housing at opposite sides of said opening for directing said run of the tape across said opening, and means engageable by said tape portion in said relatively tortuous path for imposing an increased resistance to the movement of tape therealong at least in the direction toward said run, said resiliently flexible element deflecting in response to tension in said tape portion to permit the latter to follow a relatively less tortuous path in which said resistance to movement of the tape is reduced to substantially free the tape for movement between said run and said one reel, said means for imposing an increased resistance to the movement of the tape being constituted by the surface of a fixed braking member engaged by the tape when in said tortuous path at a location between said one reel and one of said guide members at an adjacent side of said opening.

7. In a cassette for use in a magnetic recording and/or reproducing apparatus and which comprises a housing containing freely rotatable reels having magnetic tape wound thereon with the tape extending between the reels being guided to direct a run thereof across an access opening in the housing; tape braking means for avoiding slackening of said run as a result of free turning of at least one of said reels, said braking means including at least one resiliently flexible element which is fixedly mounted at one end in said housing and has its other free end engaged with said tape at a portion of the tape between said run and said one reel for urging said tape portion into a relatively tortuous path, at least one guide member in said housing at one side of said opening for directing said run of the tape across said opening, the tape, when in said tortuous path, being wrapped about a substantial portion of the surface of said guide member to impose an increased resistance to the movement of tape therealong at least in the direction toward said run, said resiliently flexible element deflecting in response to tension in said tape portion to at least reduce the portion of said surface of said guide member about which the tape is wrapped and thereby permit the latter to follow a relatively less tortuous path in which said resistance to movement of the tape is reduced and the tape is free for movement between said run and said one reel.

8. A cassette according to claim 7, in which said resiliently flexible element has said other free end portion thereof extending across a line that is tangential to said one reel from said guide so that said free end portion of said element normally diverts said tape portion from said line and tension in said tape portion urges the latter toward said line and thereby deflects said element.

9. In a cassette for use in a magnetic recording and/or reproducing apparatus and which comprises a housing containing freely rotatable reels having magnetic tape wound thereon with the tape extending between the reels being guided to direct a run thereof across an access opening in the housing; tape braking means for avoiding slackening of said run as a result of free turning of at least one of said reels, said braking means including at least one resiliently flexible plastic sheet element which is fixedly mounted at one end in said housing and has its other free end engaged with said tape at a portion of the tape between said run and said one reel for urging said tape portion into a relatively tortuous path, and means engageable by said tape portion in said relatively tortuous path for imposing an increased resistance to the movement of tape there along at least in the direction toward said run, said resiliently flexible element deflecting in response to tension in said tape portion to permit the latter to follow a relatively less tortuous path in which said resistance to movement of the tape is reduced to substantially free the tape for movement between said run and said one reel.

* * * * *